United States Patent [19]

Kittell

[11] Patent Number: 5,229,889
[45] Date of Patent: Jul. 20, 1993

[54] SIMPLE ADAPTIVE OPTICAL SYSTEM

[75] Inventor: David H. Kittell, Stamford, Conn.

[73] Assignee: Hughes Aircraft Company, Los Angeles, Calif.

[21] Appl. No.: 805,401

[22] Filed: Dec. 10, 1991

[51] Int. Cl.$^5$ .............................................. G02B 5/08
[52] U.S. Cl. .................................. 359/849; 359/846; 250/201.9
[58] Field of Search ............... 359/846, 847, 849, 871; 250/201.9

[56] References Cited

U.S. PATENT DOCUMENTS

| | | | |
|---|---|---|---|
| 4,467,186 | 8/1984 | Goralnick et al. | 250/201.9 |
| 4,492,431 | 1/1985 | Eitel et al. | 359/849 |
| 4,865,454 | 8/1989 | Lazzarini et al. | 250/201.9 |
| 4,967,063 | 10/1990 | Wang et al. | 359/849 |
| 5,128,530 | 7/1992 | Ellerbroek et al. | 250/201.9 |

OTHER PUBLICATIONS

"Inside the Keck Telescope" *Sky & Telescope,* Jul. 1990, pp. 20, 21.

*Primary Examiner*—Bruce Y. Arnold
*Assistant Examiner*—J. P. Ryan
*Attorney, Agent, or Firm*—Michael W. Sales; Wanda K. Denson-Low

[57] ABSTRACT

A system for correcting wavefront distortion includes an eight channel deformable mirror 11 attached to a two-axis, tip/tilt mount 12. The deformable mirror 11 reflects an incoming telescopic wavefront 10 onto a beamsplitter 14. The beamsplitter 14 divides the reflected telescopic wavefront 13 into two separate beams 15, 20. The beam 20 reflected by the beamsplitter 14 may be used for experimentation and measurement. The beam 15 transmitted by the beamsplitter 14 is directed toward a modified Hartmann-Shack wavefront sensor 16. The modified Hartmann-Shack sensor 16 detects the slope of the wavefront at several locations across this transmitted beam 15 and provides analog signals 17 representing these slopes to a series of actuator drive circuits 18. The actuator drive circuits 18 provide excitation signals 19 to actuators 22, 30 on the deformable mirror 11 and the two-axis, tip/tilt mount 12. These actuators 22, 30 facilitate the reforming and repositioning of the deformable mirror 11 so as to correct any incoming wavefront 10 distortion.

20 Claims, 3 Drawing Sheets

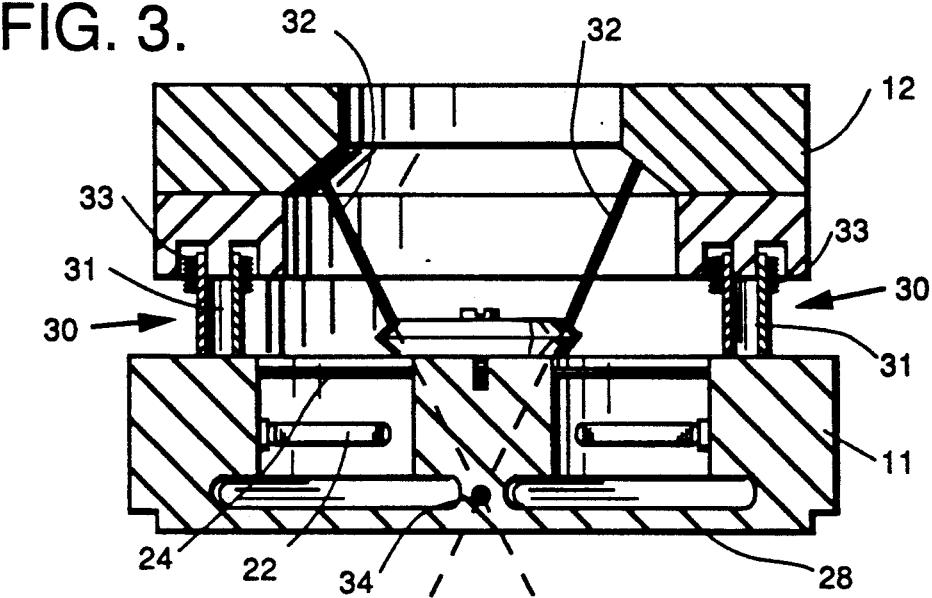
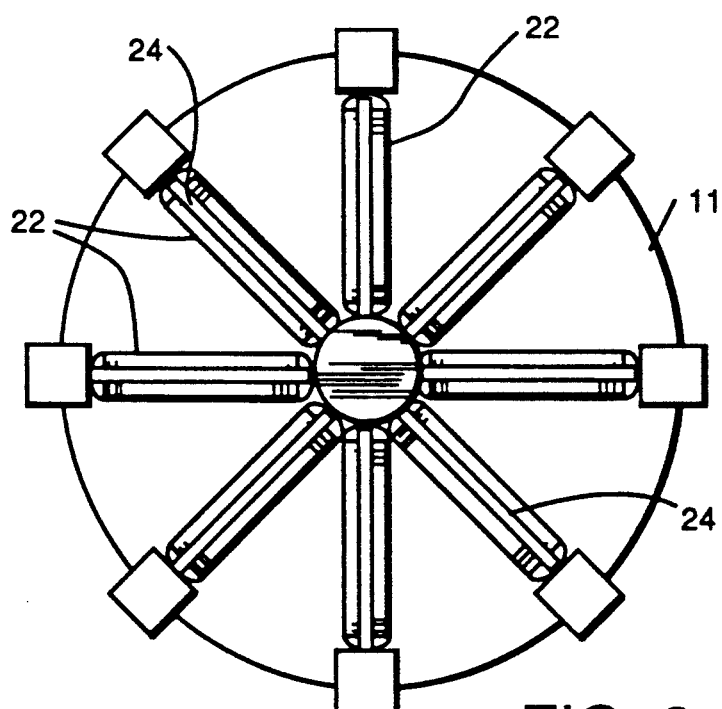

SIMPLE ADAPTIVE OPTICAL SYSTEM

BACKGROUND OF THE INVENTION

1. Field of the Invention

The present invention relates to apparatus for adaptive optics and, more particularly, to a simple adaptive optical system for correcting wavefront distortions.

2. Description of the Prior Art

Members of the astronomy community and other telescope users require undistorted telescopic wavefronts for accurate experimentation and measurement. Wavefront distortion results from imperfect telescope optical quality and atmospheric turbulence. The current method of reducing such distortion is through adaptive optical sensing and correction.

Typically, a system comprised of a nineteen channel deformable mirror, a thirty channel Hartmann-Shack wavefront sensor, a planar two-axis, tip/tilt mirror, and a high-speed computer is used for correcting wavefront nonuniformities. The computer in this system is used for correcting wavefront nonuniformities. The computer in this system is used to provide real-time feedback from the sensor to the two adjustable mirrors. Although this system is both accurate and fairly reliable, it is complex and extremely expensive. Therefore, to alleviate the burden of the cost of such a complex system a simple means of providing distortion correction on incoming telescopic wavefronts is highly desirable.

SUMMARY OF THE INVENTION

The present invention provides a simpler and thereby less expensive means of correcting incoming telescopic wavefront distortions than prior art systems. This invention contemplates an adaptive optical control system comprising a lightweight, actuator-deformable mirror which reflects an incoming telescopic wavefront to a modified Hartmann-Shack wavefront sensor. The wavefront sensor detects the slope of the incoming wavefront at several different locations across the incident beam and provides a set of analog signals, representing the slope of the wavefront at each of these locations, to a corresponding set of actuator drive circuits. These drive circuits perform both direct and difference amplification on the analog slope signals and subsequently provide excitation signals to a corresponding set of deformable mirror actuators. The excitation signals provided to these actuators serve to reshape the surface of the mirror, thereby correcting distortions in the incoming telescopic wavefront as detected by the wavefront sensor.

The major advantage of this simple adaptive optical system is that is does not require a costly computer system to provide real-time feedback from the wavefront sensor to the deformable mirror. Although a system such as the present invention can become more complex as the number of detection sensing and correction channels increase, in its present form it should provide distortion correction through third order aberrations in the incoming telescopic wavefront.

A primary objective of the present invention is to provide a means for economically correcting wavefront distortions in telescopic systems.

Another objective of the present invention is to provide a means for correcting wavefront distortions through direct analog coupling of a wavefront sensor to an actuator-deformable mirror.

Another objective of the present invention is to provide a means for correcting wavefront distortions without the need for costly computer control.

DESCRIPTION OF THE DRAWINGS

FIG. 2A is a rear view of an eight channel, actuator-deformable mirror.

FIG. 3 is a cross-sectional view of an eight channel, actuator-deformable mirror mounted to a voice-coil actuated, tip/tilt mount.

DETAILED DESCRIPTION OF THE INVENTION

Figure 1:
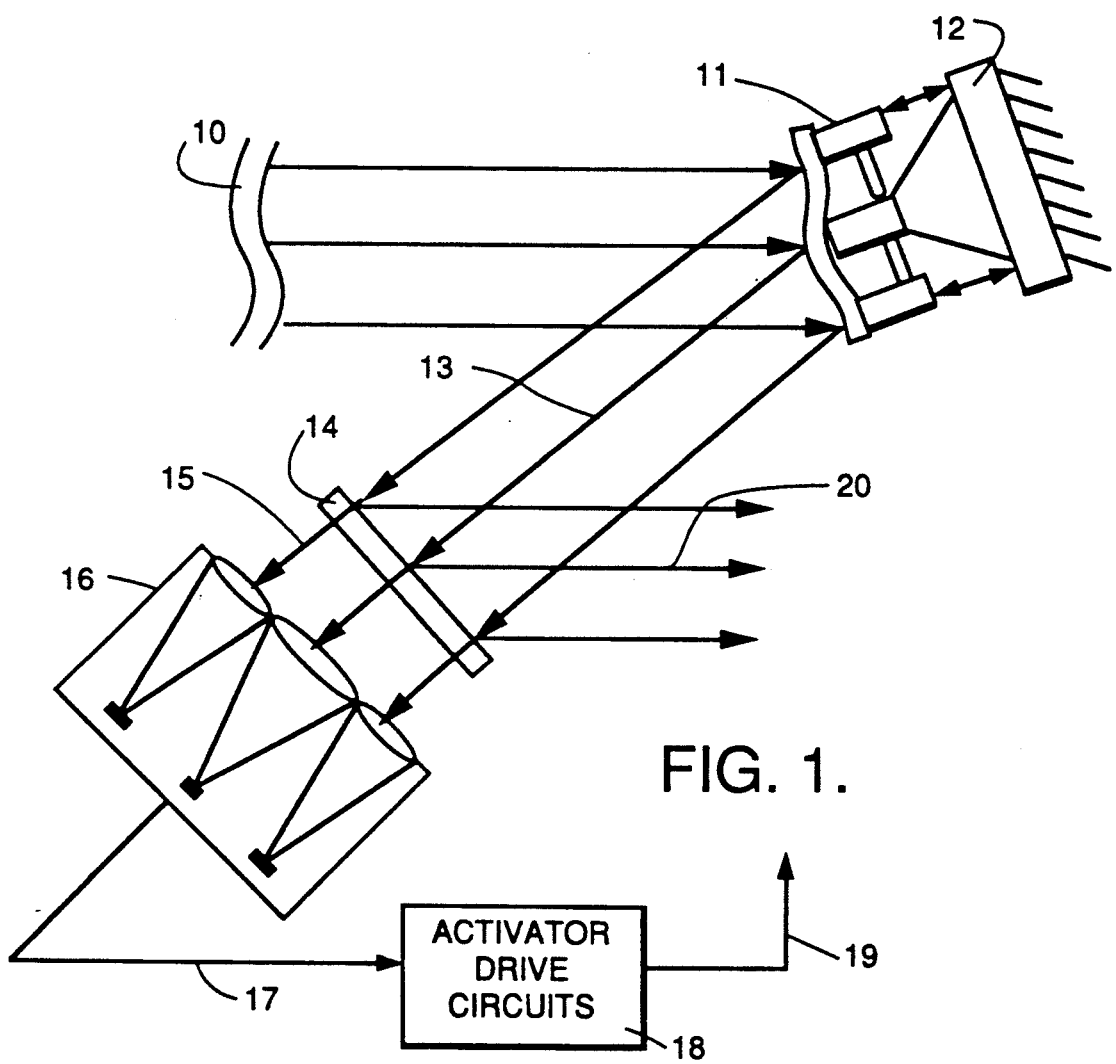
FIG. 1 is a schematic illustration of a simple, direct coupled, adaptive optical system.

Referring to FIG. 1, there is shown a distorted incoming telescopic wavefront 10. The distorted wavefront 10 is incident upon an actuator-deformable mirror 11 which is mounted to a two-axis, tip/tilt mount 12. The reflection of this wavefront 10 by the mirror 11 produces a beam 13 which is incident upon a beamsplitter 14. The beamsplitter 14 divides this incident beam 13 into two separate beams 15, 20 of predetermined ratio. One portion 20 of the beam is reflected by the beamsplitter 14 and used for purposes such as experimentation and measurement. Another portion 15 of the beam is transmitted by the beamsplitter 14 and is incident upon a modified Hartmann-Shack wavefront sensor 16. The modified Hartmann-Shack sensor 16 detects the slope of the wavefront at several different locations across this incident beam 15. A set of analog slope signals 17, corresponding to the wavefront slope detected at these locations, is generated by the sensor 16 and provided to a series of operational amplifier actuator drive circuits 18. These actuator drive circuits 18 perform both direct and difference amplification on the analog slope signals 17 and provide excitation signals 19 to the actuators in the deformable mirror 11 and the two-axis, tip/tilt mount 12. The application of the excitations signals 19 to the mirror and mount actuators 11, 12 results in the reformation and the repositioning of the mirror 11, respectively, with respect to the incoming telescopic wavefront 10, thereby compensating for distortions in the wavefront as detected by the wavefront sensor 16.

Figure 2B:
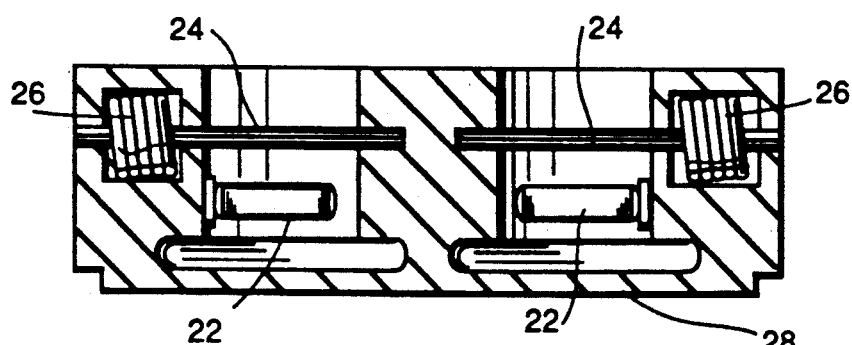
FIG. 2B is a cross-sectional view of the mirror of FIG 2A.

Referring to FIGS. 2A and 2B, there is shown an eight channel, actuator-deformable mirror 11. Each channel includes either a piezo-electric or electrostrictive actuator 22, which when excited modifies the curvature of the mirror in the area corresponding to the difference in detected slope. Tensioning rods 24 and springs 26 provide a preload mechanism for the piezoelectric or electrostrictive actuators 22 due to the inherent unidirectional expansion characteristics of these types of actuators 22 when they are electrically excited. It should be noted that the number of channels, and hence the number of actuators 22, may be more or less than eight depending upon the degree of distortion correction that is required.

Referring to FIG. 3, the eight channel deformable mirror 11 is attached to the two-axis, tip/tilt mount 12 through two, orthogonally-positioned voice-coil actuator sets and a series of elastic flexures 32. The cross-sectional view shown in FIG. 3 reveals only one actuator set 30. A voice-coil actuator set 30 includes two voice-coil drivers 31, each of which is positioned along the outside edge of the mirror 11 at opposite ends of its diameter. These voice-coil drivers 31 are shown in cross-section in FIG. 3 and are cylindrical in shape. A wire coil 33 is wound about the upper outer periphery of each voice-coil driver 31. The two voice-coil drivers 31 in each voice-coil actuator set 30 act in unison to provide a one-dimensional tilt of the entire deformable mirror structure 11 about a central axis point 34. The two voice-coil actuator set arrangement provides two-dimensional first order tilt correction of the reflecting surface 28 as detected by the Hartmann-Shack wavefront sensor 16.

Figure 4A:
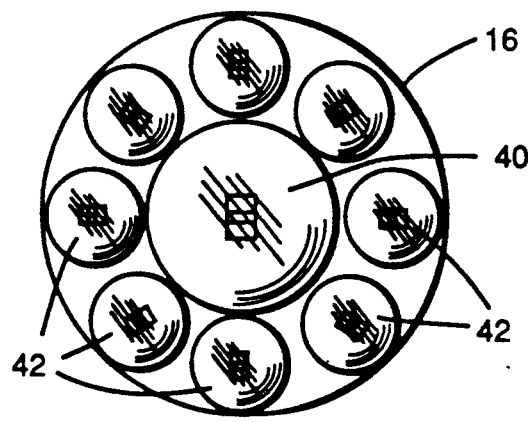
FIG. 4A is a top view of a modified Hartmann-Shack wavefront sensor.
Figure 4B:
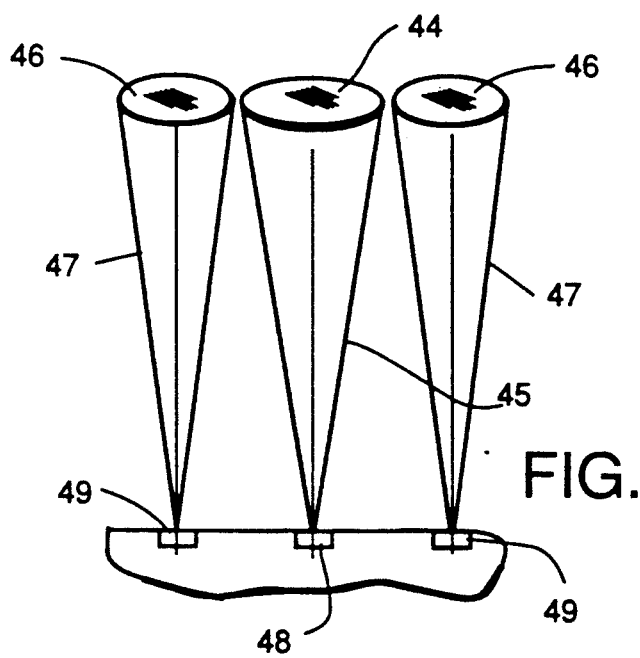
FIG. 4B is a cross-sectional view of the sensor of FIG. 4A.

Referring to FIGS. 4A and 4B, there is shown a modified Hartmann-Shack wavefront sensor 16 with a single two-dimensional sensor 40 positioned in the center and eight one-dimensional sensors 42 positioned along the periphery. A typical Hartmann-Shack sensor contains only the more complex two-dimensional sensors. The two-dimensional sensor 40, called the central sensor, includes a lens 44 which projects a beam 45 upon a quad detector 48. The eight one-dimensional sensors 42, called peripheral limb sensors, each include a lens 46 which projects a beam 47 upon a corresponding dual detector 49. Since the beams 45, 47 produced in each of these sensors 40, 42 are converging, the image produced from these beams 45, 47 upon the surface of the corresponding detectors 48, 49 is a spot. The position of each spot is detected through an electro-optical process which produces an analog signal 17 (see FIG. 1) representing the slope of the wavefront 15 incident upon the corresponding sensor lens.

Referring again to FIG. 1, the actuator drive circuits 18 which process the analog slope signals 17 are different for each type of mirror actuator 22, 30. The excitation signals 19 for the two voice-coil actuator sets are derived directly from the slope detected by the central two-dimensional sensor 40 of the modified Hartmann-Shack sensor 16. When the slope detected by the central sensor 40 is amplified and applied to the corresponding voice-coil actuator set 30, the position of the entire mirror structure 11 is adjusted to reduce any offsets in this detected slope.

The excitation signals 19 for the piezo-electric or electrostrictive actuators 22, shown in FIG. 2, are derived from the difference in detected slope between the central sensor 40 and the limb sensors 42. This difference in detected slope is referred to as the curvature error. When the curvature error between the central sensor 40 and a particular limb sensor 42 is amplified and applied to the corresponding actuator 22, the formation of the mirror surface is modified to reduce the curvature error of the deformable mirror 11 in that particular area.

By reducing the slope offsets and the curvature errors detected by the modified Hartmann-Shack wavefront sensor 16, the distortions in the beam 13 reflected by the deformable mirror 11 are reduced. This reduction in distortions allows for experimentation and measurement performed on the portion of the beam 20 reflected by the beamsplitter 14 to be accomplished with greater overall accuracy.

What is claimed is:

1. An adaptive optical system, comprising:

means for receiving and reflecting a wavefront, said means being a deformable mirror that is reformable in accordance with received excitation signals;

means for detecting distortions of the wavefront reflected from the deformable mirror means and for providing signals in accordance with the detected wavefront distortions, said distortions detecting means including a modified Hartmann-Shack wavefront sensor having a two-dimensional central sensor means for detecting central wavefront slope and a plurality of one-dimensional peripheral limb sensor means for detecting radial wavefront slope; and means for receiving the signals from the wavefront distortions detecting means and for directly providing, in response thereto, excitation signals to the deformable mirror means, such that the deformable mirror means is reformed to compensate for distortions in the wavefront.

2. An adaptive optical system as described in claim 1, wherein said deformable mirror means comprises an actuator-deformable mirror means.

3. An adaptive optical system as described in claim 2, wherein said actuator-deformable mirror means comprises:

a deformable mirror surface for reflecting and correcting said wavefront distortions;

a plurality of means for controlling the reformation of the deformable mirror surface; and a like plurality of tensioning rods and springs, each associated with one of said reformation controlling means to provide a preload mechanism for the reformation controlling means.

4. An adaptive optical system as described in claim 3, wherein each of said reformation controlling means comprises a piezo-electric actuator positioned radially across a rear side of said deformable mirror surface.

5. An adaptive optical system as described in claim 3, wherein each of said reformation controlling means comprises an electrostrictive actuator positioned radially across a rear side of said deformable mirror surface.

6. An adaptive optical system as described in claim 1, wherein said deformable mirror means additionally comprises means for mounting and positioning said deformable mirror means.

7. An adaptive optical system as described in claim 6, wherein said mounting and positioning means comprises a two-axis, tip-tilt mounting means.

8. An adaptive optical system as described in claim 7, wherein said two-axis, tip/tilt mounting means comprises:

a plurality of elastic flexures for supporting said deformable mirror means about a central axis point; and a duality of voice-coil actuator set means for controlling the position of said deformable mirror means about said central axis point.

9. An adaptive optical system as described in claim 8, wherein each of said voice-coil actuator set means comprises two voice-coil drivers positioned along an outside edge of said deformable mirror at opposite ends of a mirror diameter, said voice-coil actuator sets being orthogonally positioned.

10. An adaptive optical system as described in claim 1, wherein said two-dimensional central sensor means comprises a converging lens and a quad detector, said quad detector providing signals for controlling the position of said deformable mirror about a central axis point.

11. An adaptive optical system as described in claim 10, wherein said signals comprise a plurality of analog signals representing said detected central wavefront slope.

12. An adaptive optical system as described in claim 1, wherein each of said one-dimensional peripheral limb sensor means comprises a converging lens and a dual detector, said dual detector providing a signal for controlling the reformation of said deformable mirror.

13. An adaptive optical system as described in claim 12, wherein said signal comprises an analog signal representing said detected radial wavefront slope.

14. An adaptive optical system as described in claim 1 wherein said means for receiving signals from the wavefront distortions detecting means and for directly providing excitation signals to the deformable mirror means comprises:
   a first plurality of actuator drive circuit means for performing direct amplification of selected ones of said signals provided by said wavefront distortions detecting means; and
   a second plurality of actuator drive circuit means for performing difference amplification of selected other ones of said signals provided by said wavefront distortions detecting means.

15. An adaptive optical system as described in claim 14, wherein said wavefront distortions detecting means includes:
   a quad detector for detecting central slope of said reflected wavefront and for providing said selected ones of said signals, that represent said central slope, to said first plurality of actuator drive circuit means; and
   a plurality of dual detectors for detecting radial slope of said reflected wavefront and for providing said selected other ones of said signals, that represent said radial slopes, to said second plurality of actuator drive circuit means.

16. An adaptive optical system as described in claim 15, wherein each of said first plurality of actuator drive circuit means for performing direct amplification directly provides a selected one of said excitation signals to said deformable mirror means, said direct amplification being performed on said central slope signals.

17. An adaptive optical system as described in claim 16, wherein said provided excitation signal is an analog signal.

18. An adaptive optical system as described in claim 15, wherein each of said second plurality of actuator drive circuit means for performing difference amplification directly provides a selected one of said excitation signals to said deformable mirror means, said difference amplification being performed on a difference between said central slope signals and said radial slope signals.

19. An adaptive optical system as described in claim 18, wherein said provided excitation signal is an analog signal.

20. An adaptive optical system as described in claim 1, wherein said wavefront being reflected by said deformable mirror means is incident upon a beamsplitter, said beamsplitter providing a transmitted beam to said wavefront sensor and a reflected beam to an experimentation and measurement apparatus.

* * * * *